(12) United States Patent
Susitaival et al.

(10) Patent No.: US 10,390,350 B2
(45) Date of Patent: Aug. 20, 2019

(54) SIGNALING OF IDC PROBLEMS

(71) Applicant: Telefonaktiebolaget LM Ericsson (publ), Stockholm (SE)

(72) Inventors: Riikka Susitaival, Helsinki (FI); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/122,342

(22) PCT Filed: Jul. 1, 2016

(86) PCT No.: PCT/SE2016/050679
§ 371 (c)(1),
(2) Date: Aug. 29, 2016

(87) PCT Pub. No.: WO2017/030480
PCT Pub. Date: Feb. 23, 2017

(65) Prior Publication Data
US 2017/0181172 A1 Jun. 22, 2017

Related U.S. Application Data

(60) Provisional application No. 62/205,462, filed on Aug. 14, 2015.

(51) Int. Cl.
*H04W 72/04* (2009.01)
*H04W 72/08* (2009.01)
*H04L 5/00* (2006.01)

(52) U.S. Cl.
CPC ........... *H04W 72/082* (2013.01); *H04L 5/001* (2013.01); *H04W 72/048* (2013.01);
(Continued)

(58) Field of Classification Search
CPC ................. H04B 7/2121; H04B 7/2123; H04J 2203/0069; H04Q 2213/394; H04W 72/04;
(Continued)

(56) References Cited

U.S. PATENT DOCUMENTS

2013/0114515 A1* 5/2013 Koo ...................... H04J 11/0023
370/329
2013/0114516 A1* 5/2013 Koo ........................ H04B 15/00
370/329
(Continued)

FOREIGN PATENT DOCUMENTS

JP 2015500600 A 1/2015
RU 2008145972 A 6/2010
(Continued)

OTHER PUBLICATIONS

Unknown, Author, "Analysis of RAN4 requirements for in device coexistence (IDC)", 3GPP TSG-RAN WG4 Meeting #65 R4-126462 New Orleans, Source: Renesas Mobile Europe Ltd, Nov. 12-16, 2012, 1-22.
(Continued)

*Primary Examiner* — Robert J Lopata
(74) *Attorney, Agent, or Firm* — Murphy, Bilak & Homiller, PLLC

(57) ABSTRACT

The present disclosure provides methods, devices, and systems for signaling of In-Device Coexistence (IDC) problems in uplink (UL) Carrier Aggregation (CA). Embodiments of a method in a User Equipment (UE) in communication with an Evolved Node B (eNB) are disclosed. In some embodiments, the method in the UE comprises sending an IDC indication to the eNB including information of problematic UL CA combinations. In this manner, the eNB is provided
(Continued)

an indication from which the eNB can deduce which frequencies need to be avoided for UL CA.

22 Claims, 10 Drawing Sheets

(52) U.S. Cl.
CPC ... *H04W 72/0413* (2013.01); *H04W 72/0453* (2013.01); *H04L 5/0053* (2013.01); *H04L 5/0066* (2013.01); *H04L 5/0098* (2013.01)

(58) Field of Classification Search
CPC . H04W 72/12; H04W 76/00; H04W 72/0413; H04W 72/0453; H04W 72/048; H04W 72/082; H04L 5/0053; H04L 5/001; H04L 5/0066; H04L 5/0098
USPC .......................................................... 370/329
See application file for complete search history.

(56) References Cited

U.S. PATENT DOCUMENTS

| | | | | |
|---|---|---|---|---|
| 2013/0114583 A1* | 5/2013 | Park | .................. | H04W 52/0216 370/338 |
| 2013/0242833 A1* | 9/2013 | Ahn | .................... | H04W 72/082 370/311 |
| 2013/0242860 A1* | 9/2013 | Kim | .................... | H04W 72/082 370/328 |
| 2013/0286836 A1* | 10/2013 | Uzelac | .................. | H04L 47/125 370/235 |
| 2013/0294289 A1* | 11/2013 | Kneckt | ............... | H04W 72/082 370/254 |
| 2014/0050134 A1* | 2/2014 | Ahn | .................. | H04W 72/0413 370/311 |
| 2014/0097966 A1* | 4/2014 | Alexander | ............. | G01D 4/002 340/870.02 |
| 2014/0256247 A1* | 9/2014 | Wietfeldt | ................ | H04W 4/00 455/39 |
| 2014/0341193 A1* | 11/2014 | Lee | ....................... | H04W 24/10 370/336 |
| 2015/0195795 A1* | 7/2015 | Loehr | ................. | H04W 52/365 455/522 |
| 2015/0208452 A1* | 7/2015 | Lee | ................... | H04W 36/0061 455/426.1 |
| 2015/0215944 A1* | 7/2015 | Kim | ........................ | H04L 5/001 370/329 |
| 2015/0230286 A1* | 8/2015 | Feuersaenger | .... | H04W 72/1215 370/252 |
| 2015/0304872 A1* | 10/2015 | Sadek | .................. | H04W 24/10 370/252 |
| 2015/0305039 A1* | 10/2015 | Sebire | ..................... | H04L 5/001 370/329 |
| 2015/0319643 A1* | 11/2015 | Zhu | .................. | H04W 72/1215 370/336 |
| 2015/0358957 A1* | 12/2015 | Kim | ...................... | H04W 16/32 455/450 |
| 2015/0373729 A1* | 12/2015 | Lee | ....................... | H04W 8/245 370/329 |
| 2016/0135213 A1* | 5/2016 | Zhu | .......................... | H04L 1/00 370/329 |
| 2016/0143074 A1* | 5/2016 | Wietfeldt | ............ | H04W 76/023 370/329 |
| 2016/0234852 A1* | 8/2016 | Ko | ........................ | H04L 5/0005 |
| 2017/0094676 A1* | 3/2017 | Kim | ...................... | H04L 1/1812 |
| 2018/0013500 A1* | 1/2018 | Liao | ..................... | H04J 11/0023 |
| 2018/0092085 A1* | 3/2018 | Shaheen | ............... | H04W 28/08 |
| 2018/0262233 A1* | 9/2018 | Laselva | ................. | H04B 1/005 |

FOREIGN PATENT DOCUMENTS

| | | |
|---|---|---|
| WO | 2014051488 A1 | 4/2014 |
| WO | 2014123356 A1 | 8/2014 |

OTHER PUBLICATIONS

Unknown, Author, "In-Device Coexistence for UL inter-band CA interference on GNSS receiver", 3GPP TSG-RAN WG2 Meeting #89 R2-150471 Athens, Greece; Source: Qualcomm Incorporated, Feb. 9-13, 2015, 1-8.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 1-325.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.12.0, Jun. 2015, 1-357.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.0.0 (Jun. 2015), Jun. 2015, 1-254.
Hu, Zhenping et al., "Interference Avoidance for In-Device Coexistence in 3GPP LTE-Advanced: Challenges and Solutions", Technology Updates on LTE Advanced IEEE Communications Magazine, Nov. 2012, 60-67.
Unknown, Author , "Clarification on constructing IDC indication according to trigger conditions", 3GPP TSG-RAN WG2 Meeting #80, R2-125313, Pantech, New Orleans, Nov. 12-16, 2012, 3 pages.
Unknown, Author , "Evolved Universal Terrestrial Radio Access (E-UTRA); Radio Resource Control (RRC); Protocol Specification", 3rd Generation Partnership Project; Technical Specification Group Radio Access Network; 3GPP TS 36331, V12.6.0, Jun. 2015, 582 pages.
Unknown, Author , "Signalling for UL-CA IDC interference issue", 3GPP TSG-RAN WG2 #91, R2-153733, Ericsson, Beijing, P.R. China, Aug. 24-28, 2015, 4 pages.
Unknown, Author , "UL-CA and GNSS Interference Issue", 3GPP TSG-RAN WG2 #89,Tdoc R2-150373, Ericsson, Athens, Greece, Feb. 9-13, 2015, 6 pages.

* cited by examiner

```
AffectingUL-CA-BandCombinations-r12 ::= SEQUENCE {
    bandCombinationList-r12        BIT STRING (1..maxBandComb-r10),
    bandCombinationListAdd-r12     BIT STRING (1..maxBandComb-r11)      OPTIONAL
}
```

FIG. 2

```
AffectingUICABandCombinations-r12 ::= SEQUENCE {
    bandCombinationList-r12        SEQUENCE (SIZE (1..maxBandComb-r10)) OF BandCombInfo,
    bandCombinationListAdd-r12     SEQUENCE (SIZE (1..maxBandComb-r11)) OF BandCombInfoAdd
         OPTIONAL
}

BandCombInfo-r12     ::= INTEGER (1..maxBandComb-r10)

BandCombInfoAdd-r12  ::= INTEGER (1..maxBandComb-r11)
```

FIG. 3

SIGNALING OF IDC PROBLEMS

TECHNICAL FIELD

The present disclosure relates to uplink (UL) Carrier Aggregation (CA) and, in particular, to signaling of problematic UL CA combinations (e.g., UL CA combinations experiencing or expected to experience In-Device Coexistence (IDC) problems).

BACKGROUND

In-Device Coexistence (IDC)

More mobile devices, smartphones, etc. are, and will be, equipped with multiple radio transceivers in order to access various networks. For example, a User Equipment (UE) may be equipped with a Third Generation Partnership Project (3GPP) Long Term Evolution (LTE) transceiver, an IEEE 802.11 (i.e., WiFi) transceiver, a Bluetooth transceiver, and a Global Navigation Satellites System (GNSS) receiver. The radio transceivers within the same UE are spatially close to one another (i.e., are co-located). As such, when the radio transceivers within the same UE operate on adjacent frequencies or sub-harmonic frequencies, transmissions associated with the transmitter of one radio transceiver may interfere with the receiver of another radio transceiver. This interference situation is referred to as an IDC interference scenario, or IDC interference situation.

One approach to address this IDC interference problem, or IDC interference situation, is to minimize IDC interference between co-located radio transceivers by filtering. However, this may be technically challenging and expensive such that alternative solutions are needed. Another approach is to essentially move the interfering signal or signals either in the frequency domain or in the time domain so that interference is reduced between the radio transceivers.

In 3GPP LTE Release (Rel) 11, signaling mechanisms for IDC interference avoidance were standardized. In support of IDC interference avoidance, signaling between a UE and the network, e.g., a base station such as an evolved Node B (eNB), was introduced. A UE that supports IDC functionality indicates this capability to the network, and the network can then configure, by dedicated signaling, whether the UE is allowed to send an IDC indication.

In 3GPP LTE Rel-11, the UE may only send an IDC indication for Evolved Universal Terrestrial Radio Access (E-UTRA) uplink/downlink (UL/DL) carriers for which a Measurement Object (MO) is configured. When a UE experiences a level of IDC interference that cannot be solved by the UE itself and network intervention is required, the UE sends an IDC indication to the network via dedicated Radio Resource Control (RRC) signaling to report the IDC interference problem to the network, i.e. the IDC indication is an indication to the network that the UE is experiencing a level of IDC interference that cannot be solved by the UE. The IDC indication is preferably triggered based on actual ongoing IDC interference on the serving and/or non-serving frequencies rather than on assumptions or predictions of potential interference. When notified of an IDC problem via an IDC indication received from the UE, the eNB may apply, for example, a Frequency Division Multiplexing (FDM) solution or a Time Division Multiplexing (TDM) solution in order to mitigate or avoid the IDC interference.

An example of an FDM solution is moving an LTE signal further away from the industrial, scientific and medical (ISM) band by performing inter-frequency handover within Evolved Universal Terrestrial Radio Access Network (E-UTRAN), or an inter-RAT handover to Wideband Code Division Multiple Access (WCDMA) or other similar technologies. An example of a TDM solution is to ensure that transmission of a radio signal does not coincide with reception of another radio signal during the same time slot or period. The LTE Discontinuous Reception (DRX) mechanism may be used to provide TDM patterns (i.e., periods during which the UE's LTE transceiver may be scheduled or not scheduled) to resolve IDC issues. A DRX-based TDM solution is preferably used in a predictable way, e.g., the eNB ensures a predictable pattern of unscheduled periods using a DRX type mechanism.

To assist the eNB in selecting an appropriate solution, IDC assistance information for both FDM and TDM solutions may be sent by the UE together with the IDC indication to the eNB. The IDC assistance information comprises, for example, a list of E-UTRA carriers suffering from ongoing interference, the direction of the interference, TDM patterns or parameters to enable appropriate DRX configuration for TDM solutions on the serving E-UTRA carrier, and/or an indication if interference is over. In case of an inter-eNB handover, the IDC assistance information is preferably transferred from the source eNB to the target eNB.

A prohibit mechanism, such as an IDC indication prohibit timer, may be used to restrict the time interval at which the UE sends an IDC indication in order to avoid unnecessary IDC indication signaling. For example, a prohibit timer can prohibit the UE from sending another IDC indication message soon after it previously sent an earlier IDC indication message.

Carrier Aggregation (CA)

The LTE Rel-10 standard supports bandwidths larger than 20 Megahertz (MHz). One important requirement on LTE Rel-10 is to assure backward compatibility with LTE Rel-8. This should also include spectrum compatibility. That would imply that an LTE Rel-10 carrier that is wider than 20 MHz should appear as a number of LTE carriers to an LTE Rel-8 terminal/UE. Each such carrier can be referred to as a Component Carrier (CC). In particular, for early LTE Rel-10 deployments, it can be expected that there will be a smaller number of LTE Rel-10-capable UEs compared to many LTE legacy UEs. Therefore, it is necessary to assure an efficient use of a wide carrier also for legacy UEs, i.e. that it is possible to implement carriers where legacy UEs can be scheduled in all parts of the wideband LTE Rel-10 carrier. One way to obtain this would be by means of CA. CA implies that an LTE Rel-10 UE can receive multiple CCs, where the CCs have, or at least possibly have, the same structure as a Rel-8 carrier. CA is illustrated in FIG. 1. A CA-capable UE is assigned a primary cell (PCell) which is always activated, and one or more secondary cells (SCells) which may be activated or deactivated dynamically.

The number of aggregated CCs as well as the bandwidth of the individual CC may be different for uplink and downlink. A symmetric configuration refers to the case where the number of CCs in downlink and uplink is the same, whereas an asymmetric configuration refers to the case where the number of CCs in the downlink is different than the number of CCs in the uplink. It is important to note that the number of CCs configured in a cell may be different from the number of CCs seen by a UE. A UE may, for example, support more downlink CCs than uplink CCs, even though the cell is configured with the same number of uplink and downlink CCs.

In addition, a key feature of CA is the ability to perform cross-carrier scheduling. This mechanism allows an (enhanced or evolved) Physical Downlink Control Channel ((E)PDCCH) on one CC to schedule data transmissions on another CC by means of a 3-bit Carrier Indicator Field (CIF) inserted at the beginning of the (E)PDCCH messages. For data transmissions (i.e., Physical Downlink Shared Channel (PDSCH) transmissions) on a given CC, a UE expects to receive scheduling messages on the (E)PDCCH on just one CC—either the same CC, or a different CC via cross-carrier scheduling. This mapping from (E)PDCCH to PDSCH is also configured semi-statically.

The UE signals an indication of whether it supports CA in its capability signaling. A band combination is signaled to indicate a combination of bands that is supported by the UE. A band combination includes information for each band entry of both DL and UL carriers and supported Multiple Input Multiple Output (MIMO) and Channel State Information (CSI) capabilities. For intra-band non-contiguous CA, there can be multiple band entries for each band in the band combination.

UL CA has been standardized in Rel-10, and Radio Access Network Working Group 4 (RAN4) requirements for UL CA have been completed. Before that, CA was mainly concerned with aggregation of DL carriers. For UL CA, some new problems have arisen which have not been addressed or discussed with respect to Rel-11 IDC.

SUMMARY

The present disclosure provides methods, devices, and systems for signaling of In-Device Coexistence (IDC) problems in uplink (UL) Carrier Aggregation (CA). Embodiments of a method in a User Equipment (UE) in communication with an evolved Node B (eNB) are disclosed. In some embodiments, the method in the UE comprises sending an IDC indication to the eNB including information of problematic UL CA combinations. In this manner, the eNB is provided an indication from which the eNB can deduce which frequencies need to be avoided for UL CA.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of a method in an eNB in communication with a UE are also disclosed. In some embodiments, the method in the eNB comprises receiving an IDC indication from the UE including information of problematic UL CA combinations. In some embodiments, the eNB deduces frequencies to avoid UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of a UE for communication with an eNB are also disclosed. In some embodiments, the UE is adapted to send an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of an eNB for communication with a UE are also disclosed. In some embodiments, the eNB is adapted to receive an IDC indication from the UE including information of problematic UL CA combinations. In some embodiments, the eNB is adapted to deduce frequencies to avoid for uplink carrier aggregation from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, a UE for communication with an eNB comprises at least one transceiver, at least one processor, and memory storing instructions executable by the at least one processor whereby the UE is operable to send, via the at least one transceiver, an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, an eNB for communication with a UE comprises at least one communication interface, at least one processor, and memory storing instructions executable by the at least one processor whereby the eNB is operable to receive, via the at least one communication interface, an IDC indication from the UE including information of problematic UL CA combinations. In some embodiments, the eNB is adapted to deduce frequencies to avoid UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, a UE for communication with an eNB comprises a problematic combinations module operable to send an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, an eNB for communication with a UE comprises a receive module operable to receive an IDC indication from the UE including information of problematic UL CA combinations. In some embodiments, the eNB further comprises a deduce module operable to deduce frequencies to avoid for UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Further embodiments include a user equipment comprising one or more transceivers, at least one processor, and memory storing instructions executable by the at least one processor whereby the UE is operable to send at least one indicator of at least one problematic uplink carrier aggregation frequency band combination to a network node.

In some embodiments, the user equipment is further operable to send compatibility information to a network node, the compatibility information indicating a plurality of uplink carrier aggregation frequency band combinations supported by the user equipment, wherein sending the at least one indicator comprises sending a bit map for the plurality of supported band combinations that indicates, for each combination, whether the combination is problematic.

In some embodiments, the user equipment is further operable to send compatibility information to a network node, the compatibility information indicating a plurality of uplink carrier aggregation frequency band combinations supported by the user equipment, wherein sending the at least one indicator comprises sending a list of indexes comprising problematic UL CA frequency band combinations.

In some embodiments, the user equipment is further operable to receive a configuration from a network node to measure on a plurality of frequency bands, wherein the at least one problematic uplink carrier aggregation frequency band combination is at least one combination of the plurality of frequency bands that the user equipment is configured to measure on and that the UE has determined is problematic.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 shows an ASN.1 example of a first embodiment of the present disclosure for a bit map indicating problematic band combinations;

FIG. 3 shows an ASN.1 example of a second embodiment of the present disclosure for a list of indexes to problematic band combinations;

DETAILED DESCRIPTION

Figure 1:
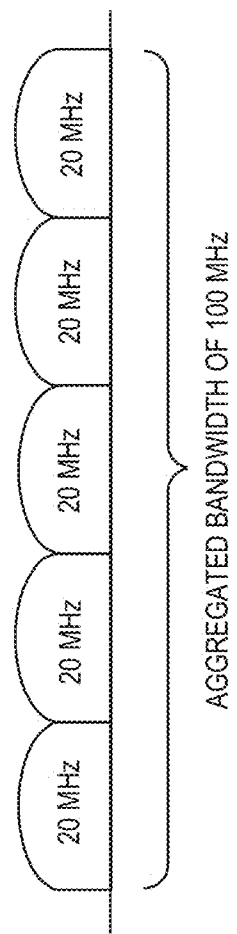
FIG. 1 illustrates aggregated bandwidth of 100 megahertz (MHz) in Carrier Aggregation (CA)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Many mobile devices (e.g., smartphones, etc.) are or will be equipped with multiple radio transceivers in order to access various networks. For example, a UE may be not equipped with a 3GPP LTE transceiver, an IEEE 802.11 (i.e., WiFi) transceiver, a Bluetooth transceiver, and a Global Navigation Satellites System (GNSS) receiver. The radio transceivers within the same UE are spatially close to one another (i.e., are co-located). As such, when the radio transceivers within the same UE operate on adjacent frequencies or sub-harmonic frequencies, transmissions associated with the transmitter of one radio transceiver may interfere with the receiver of another radio transceiver. This interference situation is referred to as an In-Device Coexistence (IDC) interference scenario, or IDC interference situation.

Recently, a problem has been identified where two or more simultaneous uplink (UL) inter-band transmissions, such as those transmitted by a UE operating according to a UL CA scheme, cause Inter-Modulation (IM) products that result in potential interference to a co-located GNSS receiver. Almost half of the two UL Component Carrier (CC) (2UL) inter-band Carrier Aggregation (CA) configurations that are currently being specified for 3GPP LTE generate IM products of up to 5th order that fall onto GNSS receive bands, thus causing an IDC problem. Even the impact of 5th order IM due to 2UL inter-band CA on a GNSS receiver is non-negligible. In addition, it has been identified that other systems (Bluetooth, Wireless Local Area Network (WLAN), etc.) may suffer from IM products from UL CA.

An IDC mechanism (i.e., a mechanism that avoids IDC interference) was introduced in 3GPP LTE Release (Rel) 11). This IDC mechanism addressed problem scenarios in which the UE suffers from interference between the LTE and Industrial, Scientific, and Medical (ISM)/GNSS signals. Both the case in which LTE is the victim and the case in which LTE is the aggressor were considered. However, UL CA problems were not considered for the 3GPP LTE Rel-11 IDC avoidance mechanism.

In the 3GPP LTE Rel-11 IDC mechanism, the UE indicates a problematic LTE frequency (as it indicates a Measurement Object (MO)) and then the UE indicates if this LTE frequency is a victim or aggressor with parameter interferenceDirection. In 3GPP LTE Rel-11, a problematic LTE frequency/carrier is one on which the UE is experiencing an IDC problem (i.e., IDC interference is at a level that cannot be solved by the UE itself). If the direction is "eutra," then the eNB can avoid problematic transmissions on the LTE downlink; and, if the direction is "other," then the eNB can avoid problematic transmissions on the LTE UL. If the direction is "both," then both UL and DL transmissions/receptions need to be taken into account.

When using the signaling for the current IDC mechanism specified in 3GPP LTE Rel-11, the network cannot deduce that an IM product of a CA combination of multiple frequencies is a problem as the signaling for the current IDC mechanism lists only single frequencies. Instead, the eNB may deduce incorrectly that the carriers cannot be used even as Primary Cells (PCells). Thus, some additional information is needed.

One option for addressing this problem is that information of which UL CA combinations are problematic is included in the IDC indication. In this way, the eNB (i.e., the network) can directly deduce which LTE frequencies need to be avoided for UL CA.

A second option to address this problem is to include GNSS type of the GNSS receiver implemented at the UE. From this information, the eNB can derive which UL CA combinations are problematic. However, there are two problems with this approach, namely: 1) this approach is not applicable to the Bluetooth and WLAN (e.g., WiFi) case and 2) depending on UE implementation, the interference problems due to different modulation orders may vary.

A third option to address this problem is for the UE to signal victim frequency (ISM or GNSS frequency) and bandwidth together with the victim technology to the eNB. However, this approach has similar problems as the current IDC mechanism; namely, for the eNB, it would still be difficult to determine which LTE frequencies/carriers to limit.

Embodiments of the present disclosure provide a mechanism for how a UE can indicate problematic UL carrier frequencies in such a way that signaling load remains limited. Based on this indication, the eNB can reduce UL transmissions on the LTE carrier frequencies and thus avoid interference.

In some embodiments, a solution to solve the IDC problem in case of UL CA is to signal problematic UL CA combinations on the LTE side. This would be sufficient information for the eNB to solve the problem.

IDC Signaling Utilizing UE Capability Signaling

In principle, the UE could signal all possible UL CA combinations that are problematic in the IDC indication. Signaling would include frequency information (e.g., center frequency and bandwidth) for each carrier to be a candidate for aggregation in a carrier combination. However, as there are many combinations, the signaling overhead would be quite large.

Embodiments disclosed herein utilize a UE's capability signaling where frequency information is already given. In some embodiments, the UE signals an index referring to a band combination entry in the UE capability signaling to indicate which UL CA combinations suffer from IDC interference. UE capability signaling may include a list of all band combinations over which the UE supports CA. Each band entry includes information of the band frequency, bandwidth, class, etc.

In LTE Rel-10, there are 128 potential combinations (maxBandComb-r10) and in Rel-11 there are 256 potential combinations (maxBandComb-r11).

In a first embodiment, the signaling includes a bit map indicating if the corresponding band combination is problematic. Here, the bit is "1" if the corresponding band combination in the capability list is suffering from IDC interference and otherwise "0." The length of the bit map corresponds to the number of band combinations in the capability signaling. FIG. 2 shows an ASN.1 example of the first embodiment.

In a second embodiment, the UE can indicate the list of indexes to the problematic band combinations. As such, the UE would signal, e.g., that the 5th band combination in the band combination list in the UE capability signaling is suffering from an IDC problem. FIG. 3 shows an ASN.1 example of the second embodiment.

The first embodiment is good if most of the band combinations suffer from interference. The second embodiment is better if only few combinations suffer from interference.

IDC Signaling Utilizing Measurement Object Identities (IDs)

In LTE Rel-11, the UE was only allowed to report IDC issues occurring or expected to occur on/by a carrier for which a measurement object is configured (from 3GPP TS 36.331 (version 11.1.0, September 2012), section 5.6.9.3: "include the IE affectedCarrierFreqList with an entry for each affected E-UTRA carrier frequency for which a measurement object is configured"). This was based on the assumption that the network would typically configure a RRM measurement on a carrier before configuring it as serving cell. As soon as the measurement object is configured the UE should report (expected) IDC problems.

Following the same principle, the UE would only indicate IDC problems for a supported combination of UL carriers if measurement objects are configured for all corresponding DL carriers of that combination.

a) measurement objects are configured for all the (corresponding DL) carriers; and b) the UE supports UL CA among those carriers; and c) the UE experiences or expects to experience IDC problems due to that carrier combination.

In this embodiment, a carrier combination is identified by a set of the corresponding MeasObjectId's (i.e., Measurement Object IDs). Assuming LTE Rel-10 CA as baseline up to 5 CCs, for each combination, there can be up to 5 measurementObjects indicated. For LTE Rel-13, there can be more objects in the combination.

Here is an example of this solution:

UE supports bands 1, 2, 3, 4. Each of the bands has two possible carriers, called a and b. UE supports UL CA of 1+2 and 1+3

Step 1: The UE has its PCell on carrier a of band 1 (called 1a). It has a measObject (ID=0) for 1a but no IDC issues.
=>No IDC report Step 2: The eNB configures a measObject (ID=1) for carrier 3b. The UE has no UL or DL IDC problems
=>No IDC report Step 3: The eNB configures a measObject (ID=2) for carrier 2a. The UE has no immediate IDC problems but knows that it would have problems if the eNB decides to configure UL CA between carrier 1a and 2a.
=>The UE sends an IDC indication "idcCombinations= [[0,2]]" (list with only one combination which comprises two carriers)
=>The eNB knows that the carriers corresponding to measurement object IDs 0 and 2 (carrier 1a and 2a) would cause an UL IDC issue.

Step 4: The UE no longer needs WLAN and hence the UL combination of 1a and 2a would no longer cause problems Step 5: The UE sends an IDC indication "idcCombinations=0"
=>The eNB configures UL CA.

Combination of Different Solutions

In the combined embodiment solution, the UE signals the index related to the band combination in the UE's capability signaling to indicate the problematic CA configuration as discussed above and presented below with respect to in FIG. 5. However, in some embodiments, the UE is allowed to signal such index only if the measurements (that is, measurement objects) are configured for the corresponding carriers.

In addition, in some embodiments, the eNB may configure which solution to use with the Radio Resource Control (RRC) signaling. If the eNB typically configures measurements before configuring CA, then the solution as described above in the section "IDC Signaling Utilizing Measurement Object IDs" and presented below with respect to FIGS. 6 and 7 can be configured. On the other hand, if the eNB is interested in IDC problems even when measurements are not configured, then it configures the mechanism as described above with respect to the first and second embodiments, as described above in the section "IDC Signaling Utilizing UE Capability Signaling" and presented below with respect to FIG. 5.

Figure 4:
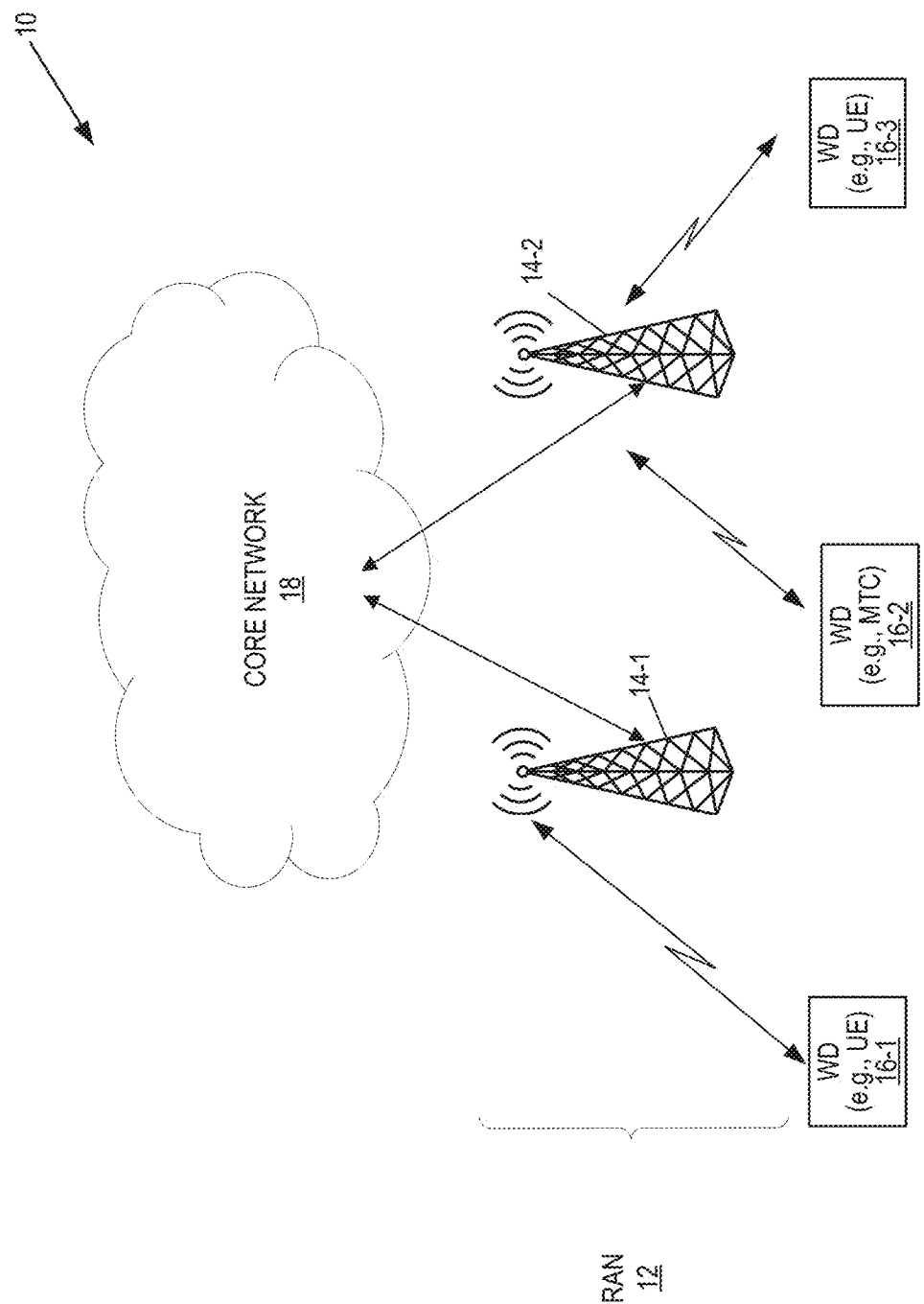
FIG. 4 illustrates a cellular communications network according to some embodiments of the present disclosure.

Example System Architecture and Operation Thereof According to Embodiments Above FIG. 4 illustrates a cellular communications network 10 according to some embodiments of the present disclosure. In some embodiments, the cellular communications network 10 is a LTE (i.e., LTE or LTE-Advanced) cellular communications network. As such, LTE terminology is oftentimes used throughout this disclosure. However, the concepts and embodiments disclosed herein are not limited to LTE and may be utilized in any suitable type of cellular or wireless network.

As illustrated, the cellular communications network 10 includes a Radio Access Network (RAN) 12 including a number of base stations 14-1 and 14-2 (generally referred to herein collectively as base stations 14 and individually as base station 14). The base stations 14 provide wireless access to wireless devices 16-1 through 16-3 (generally referred to herein collectively as wireless devices 16 and individually as wireless device 16) within coverage areas (e.g., cells) of the base stations 14. The base stations 14 are connected to a core network 18. Note that while only two base stations 14 and three wireless devices 16 are illustrated in this example for clarity and ease of discussion, the cellular communications network 10 may include many base stations 14 serving many wireless devices 16. In LTE terminology, the wireless devices 16 are referred to as UEs and, as such, the wireless devices 16 are sometimes referred to herein as UEs 16. Likewise, in LTE terminology, the base stations 14 are referred to as Evolved, or Enhanced, Node Bs (eNBs) and, as such, the base stations 14 are sometimes referred to herein as eNBs 14. While in this embodiment the base stations 14 are macro base stations, the RAN 12 may include a mixture of macro base stations and lower power base stations (i.e., pico base stations, femto base stations, home eNBs, etc.). Some of the wireless devices 16 may be MTC devices that perform Machine-to-Machine (M2M) communication. Some examples of MTC devices are smart meters, signboards, cameras, remote sensors, laptops, and appliances. In this example, the wireless device 16-2 is a MTC device.

Figure 5:
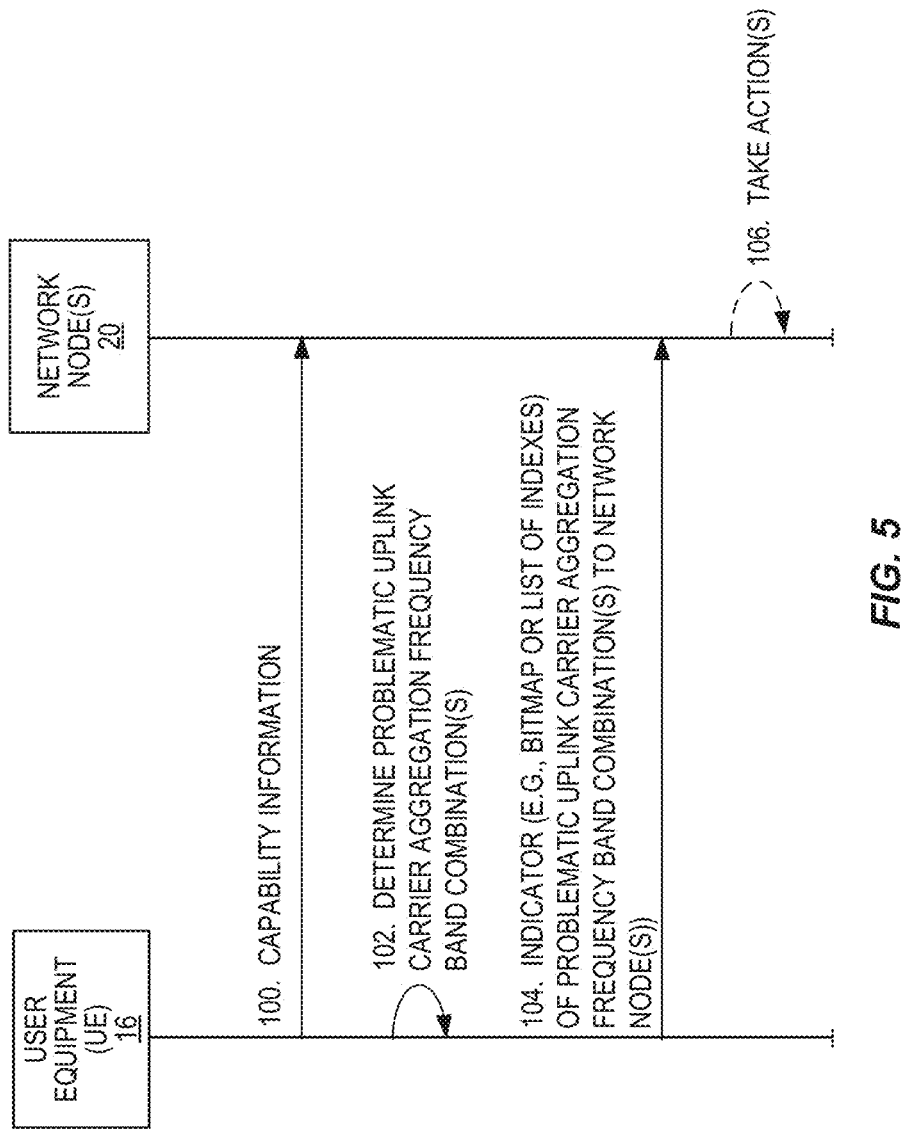
FIGS. 5-9 illustrate operation of wireless devices/user equipments and network nodes according to different embodiments of the present disclosure.

FIGS. 5 through 8 are illustrations of at least some of the embodiments described above. FIG. 5 illustrates IDC signaling utilizing UE capability signaling including the first and second embodiments detailed above in the section "IDC Signaling Utilizing UE Capability Signaling." Notably, the network node that receives the capability information may be the same or different than the network node that receives an indicator of the problematic UL CA frequency band combinations.

The process of FIG. 5 will now be described with respect to the UE 16 and a network node(s) 20. The network node(s) 20 may be, for example, the base station 14 (e.g., an eNB), multiple base stations 14 (e.g., multiple eNBs), or some other network node(s). As illustrated, the UE 16 sends capability information to the network node(s) 20 (step 100). As described above, in some embodiments, the capability information includes a list of all band combinations over which the wireless device 16 supports CA. In other words, the capability information includes a list of all UL CA combinations (i.e., a list of all UL CA combinations) supported by the UE 16.

The UE 16 determines one or more problematic UL CA frequency band combinations (step 102). The one or more problematic UL CA frequency band combinations are one or more UL CA frequency band combinations for which the UE 16 is experiencing IDC problems or, in some embodiments, is expected to experience IDC problems. An IDC problem occurs when the level of IDC interference is at a level that cannot be resolved by the UE 16 itself.

The UE 16 sends at least one indicator of the one or more problematic UL CA frequency band combinations to the network node(s) 20 (step 104). As discussed above, in some embodiments, the at least one indicator is a bit map that includes a separate bit for each combination indicated in the capability information sent to the network node(s) 20 in step 100. The value of a particular bit indicates whether or not there is an IDC problem for the corresponding combination (e.g., "1" indicates an IDC problem and "0" indicates no IDC problem). As also described above, in some other embodiments, the at least one indicator is at least one index, where an index identifies a corresponding entry in the list of combinations supported by the UE 16 provided to the network node(s) 20 in step 100. Note that the network node 20 to which the at least one indicator is sent may or may not be the same as the network node 20 to which the capability information is sent in step 100. Optionally, the network node(s) 20 take one or more actions based on the received indicator(s) (step 106). The one or more actions may be, for example, one or more actions to avoid the IDC problem(s).

Figure 6:
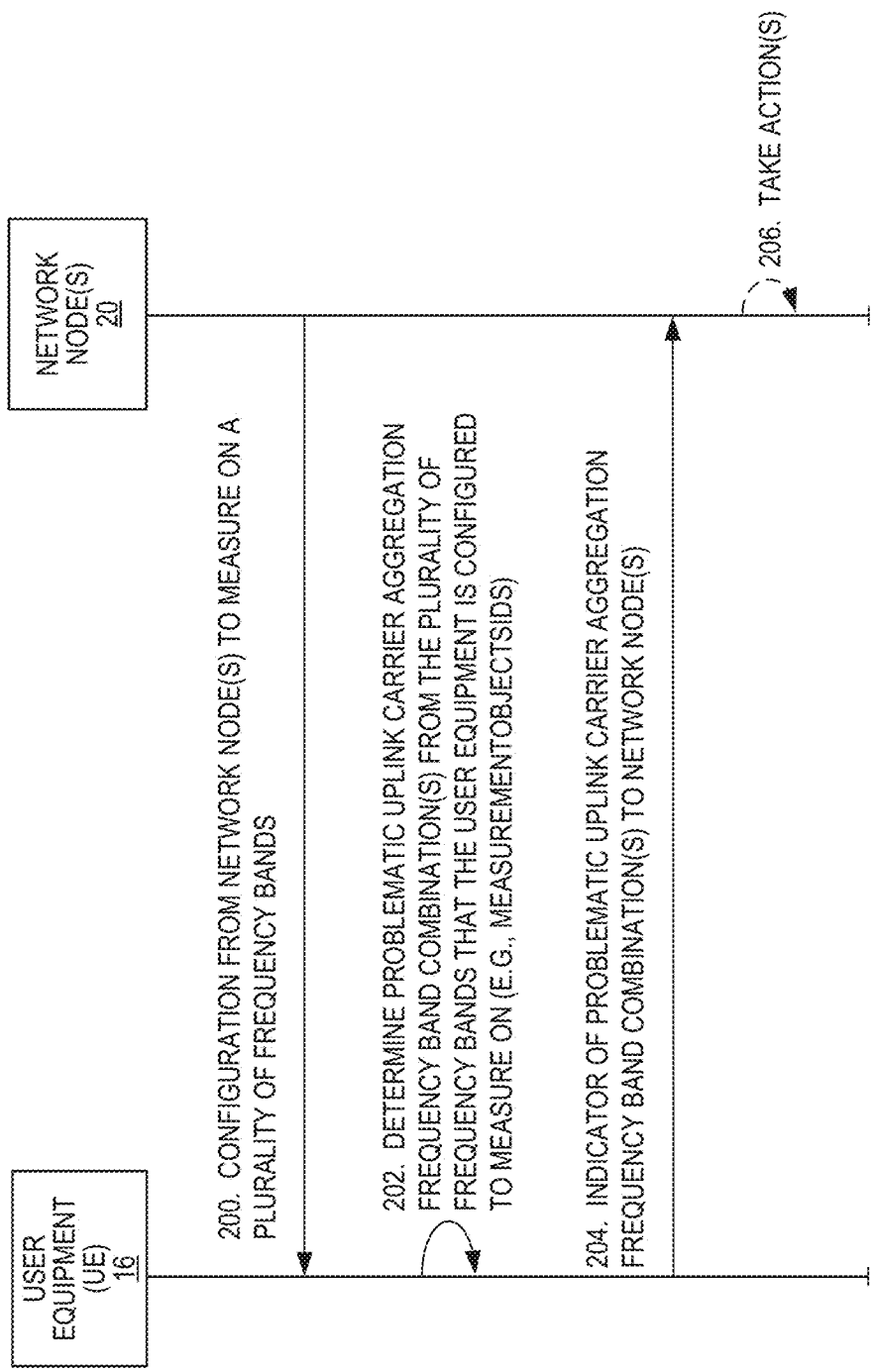

FIG. 6 illustrates IDC signaling utilizing measurementObjectsIDs including the third embodiment detailed above in the section "IDC Signaling Utilizing Measurement Object IDs." Notably, the network node 20 that sends the configuration to measure on a plurality of frequency bands may be the same or different than the network node 20 that receives an indicator of the problematic UL CA frequency band combinations. Further, the measurement configuration illustrated in FIG. 6 may be via, for example, one or more measurement objects.

The process of FIG. 6 will now be described with respect to the UE 16 and a network node(s) 20. The network node(s) 20 may be, for example, the base station 14 (e.g., an eNB), multiple base stations 14 (e.g., multiple eNBs), or some other network node(s). As illustrated, the network node(s) 20 configure the UE 16 to measure on a plurality of (i.e., multiple) frequency bands (step 200). As discussed above, in some embodiments, the network node(s) 20 configure the UE 16 with Measurement Objects for carriers on which the UE 16 is to perform measurements. The Measurement Objects have corresponding Measurement Object IDs.

The UE 16 determines one or more problematic UL CA frequency band combinations from the frequency bands on which the UE 16 is configured to perform measurements (step 202). More specifically, as discussed above, the UE 16 determines that a particular UL CA frequency band combination is problematic if: (a) Measurement Objects are configured for all of the (corresponding DL) carriers, (b) the UE 16 supports UL CA among those carriers, and (c) the UE 16 experiences or expects to experience IDC problems due to that carrier combination.

The UE 16 sends at least one indicator of the one or more problematic UL CA frequency band combinations to the network node(s) 20 (step 204). As discussed above, in some embodiments, for each problematic UL CA frequency band combination, the at least one indicator includes the Measurement Object IDs of the Measurement Objects configured for the UE 16 for the corresponding (DL) carriers. Note that the network node 20 to which the at least one indicator is sent may or may not be the same as the network node 20 from which the configuration was received by the UE 16 in step 200. Optionally, the network node(s) 20 take one or more actions based on the received indicator(s) (step 206). The one or more actions may be, for example, one or more actions to avoid the IDC problem(s).

Figure 7:
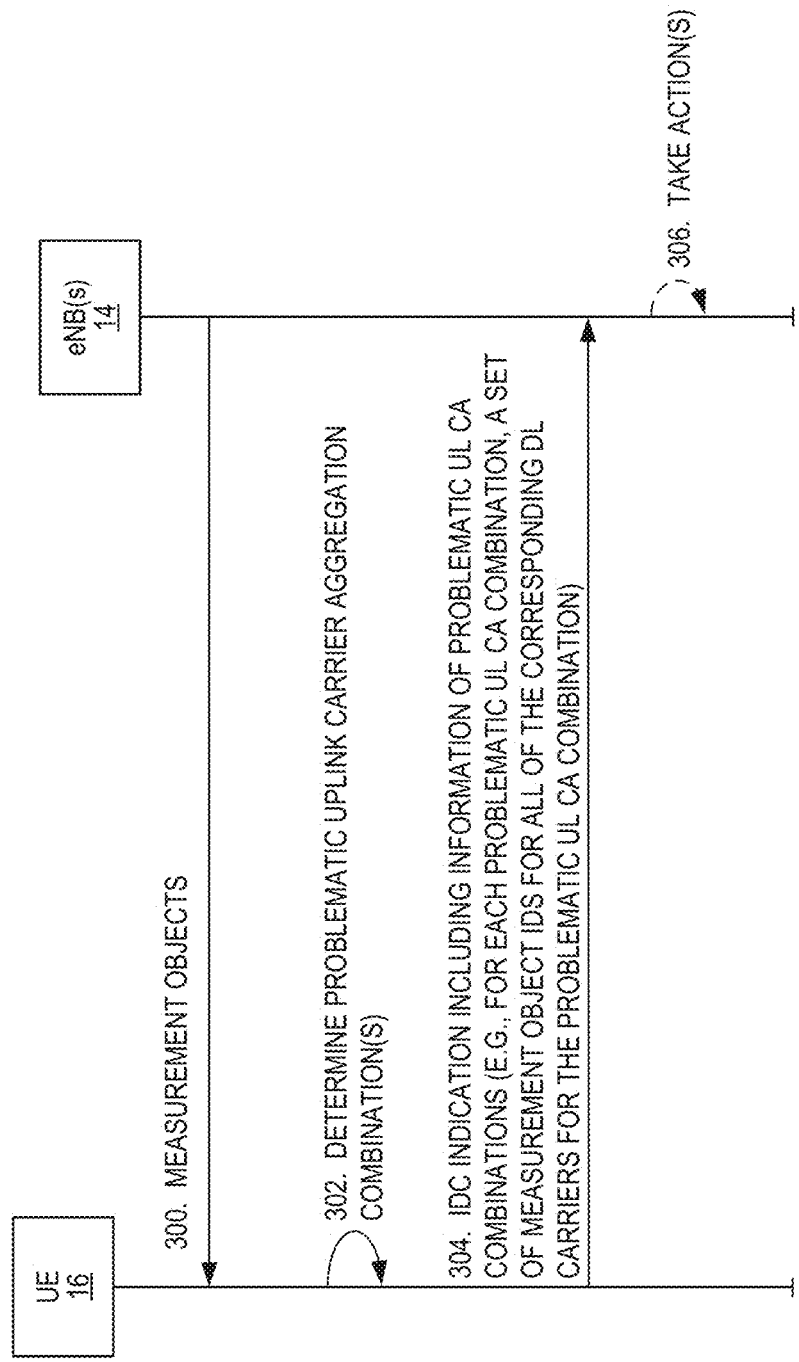

FIG. 7 illustrates one particular example of the embodiment of FIG. 6. In this example, FIG. 7 illustrates that the configuration is a configuration of Measurement Objects and that the IDC indication includes Measurement Object IDs, as described above. Otherwise, the process is the same as described above with respect to FIG. 6. Notably, the process of FIG. 7 is illustrated with respect to a UE 16 and an eNB(s) 14; however, the process is more generally applicable to a wireless device 16 and a network node(s) 20. As illustrated, the eNB(s) 14 configure the UE 16 with Measurement Objects for multiple downlink carriers (step 300). The UE 16 determines one or more problematic UL CA frequency band combinations (step 302). More specifically, as discussed above, the UE 16 determines that a particular UL CA frequency band combination is problematic if: (a) Measurement Objects are configured for all of the (corresponding DL) carriers, (b) the UE 16 supports UL CA among those carriers, and (c) the UE 16 experiences or expects to experience IDC problems due to that carrier combination.

The UE 16 sends an IDC indication including information of problematic UL CA combinations to the eNB(s) 14 (step 304). In general, the IDC indication includes Measurement Object IDs indicating the one or more problematic UL CA combinations to the eNB(s) 14. More specifically, as described above, for each problematic UL CA combination, the IDC indication includes a set of Measurement Object IDs for all corresponding DL carriers for the problematic UL CA combination. Note that the eNB 14 to which the at least one indicator is sent may or may not be the same as the eNB 14 from which the configuration was received by the UE 16 in step 300. Optionally, the eNB(s) 14 take one or more actions based on the received indicator(s) (step 306). The one or more actions may be, for example, one or more actions to avoid the IDC problem(s).

Figure 8:
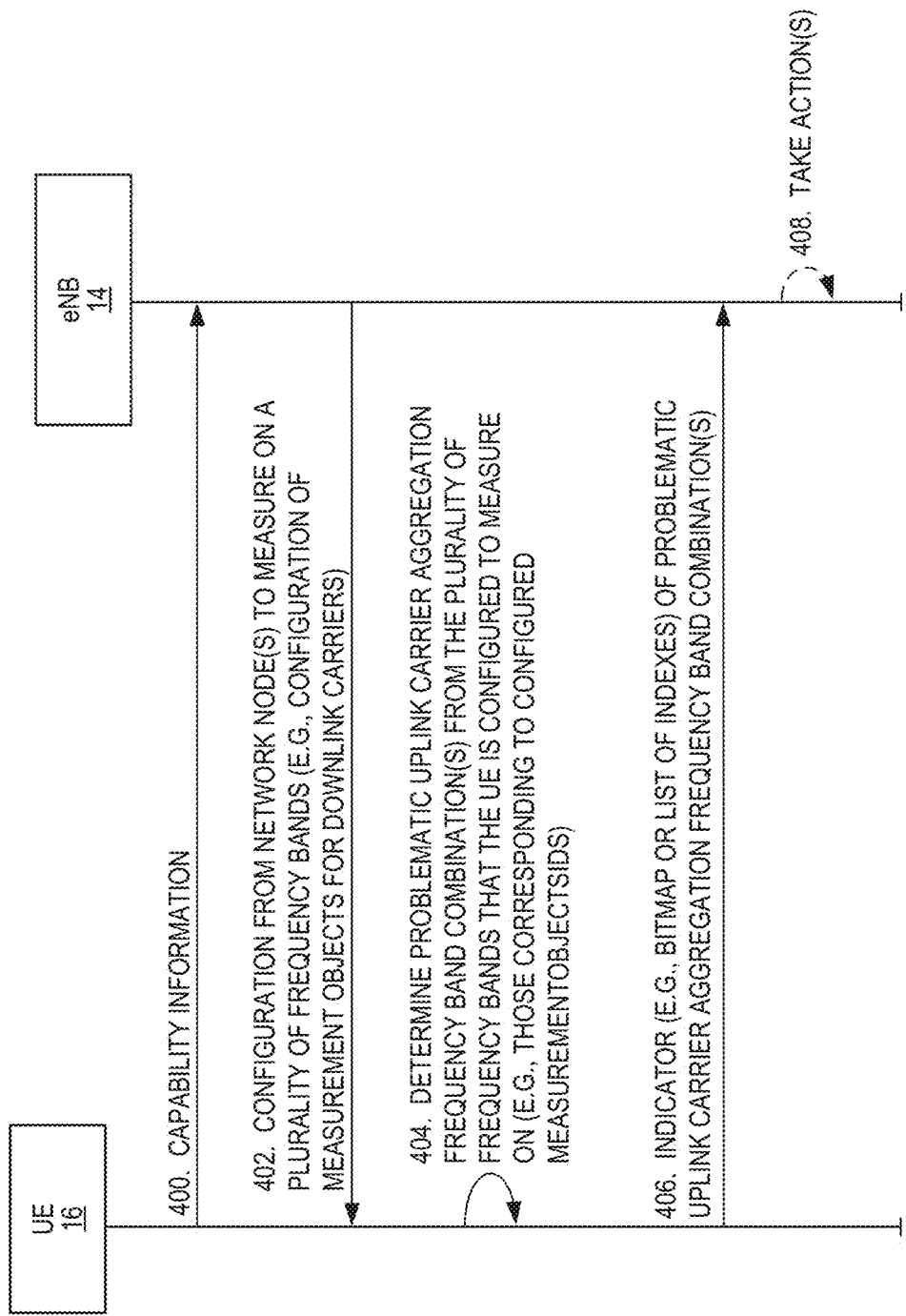

FIG. 8 illustrates IDC signaling according to embodiments detailed above in the section "Combination of Different Solutions." Notably, the process of FIG. 8 is illustrated with respect to a UE 16 and an eNB(s) 14; however, the process is more generally applicable to a wireless device 16 and a network node(s) 20 (e.g., the base station 14 (e.g., an eNB), multiple base stations 14 (e.g., multiple eNBs), or some other network node(s)). As illustrated, the UE 16 sends capability information to the eNB(s) 14 (step 400). As described above, in some embodiments, the capability information includes a list of all band combinations over which the UE 16 supports CA. In other words, the capability information includes a list of all UL CA combinations (i.e., a list of all UL CA combinations) supported by the UE 16. In addition, the eNB(s) 14 configures the UE 16 to measure on a plurality of (i.e., multiple) frequency bands (step 402). As discussed above, in some embodiments, the eNB(s) 14 configures the UE 16 with Measurement Objects for carriers on which the UE 16 is to perform measurements. The Measurement Objects have corresponding Measurement Object IDs.

The UE 16 determines one or more problematic UL CA frequency band combinations from the frequency bands on which the UE 16 is configured to perform measurements (step 404). More specifically, as discussed above, the UE 16 determines that a particular UL CA frequency band combination is problematic if: (a) Measurement Objects are configured for all of the (corresponding DL) carriers, (b) the UE 16 supports UL CA among those carriers, and (c) the UE 16 experiences or expects to experience IDC problems due to that carrier combination.

The UE 16 sends at least one indicator of the one or more problematic UL CA frequency band combinations to the eNB(s) 14 (step 406). As discussed above, in some embodiments, the at least one indicator is a bit map that includes a separate bit for each combination indicated in the capability information sent to the eNB(s) 14 in step 400. The value of a particular bit indicates whether or not there is an IDC problem for the corresponding combination (e.g., "1" indicates an IDC problem and "0" indicates no IDC problem). As also described above, in some other embodiments, the at least one indicator is at least one index, where an index identifies a corresponding entry in the list of combinations supported by the UE 16 provided to the eNB(s) 14 in step 400. Note that the eNB 14 to which the at least one indicator is sent may or may not be the same as the eNB 14 to which the capability information is sent in step 400. Optionally, the eNB(s) 14 take one or more actions based on the received indicator(s) (step 408). The one or more actions may be, for example, one or more actions to avoid the IDC problem(s).

Figure 9:
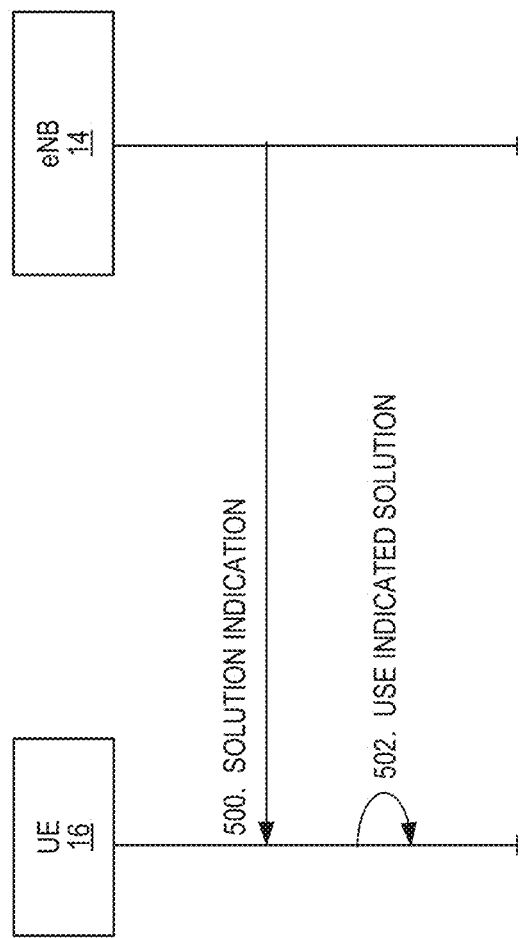

FIG. 9 illustrates an embodiment detailed above in the section "Combination of Different Solutions" in which an eNB 14 configures the UE 16 with the solution, or technique, to use for IDC signaling. Notably, the process of FIG. 9 is illustrated with respect to a UE 16 and an eNB(s) 14; however, the process is more generally applicable to a wireless device 16 and a network node(s) 20 (e.g., the base station 14 (e.g., an eNB), multiple base stations 14 (e.g., multiple eNBs), or some other network node(s)). As illustrated, the eNB 14 sends a solution indication to the UE 16 (step 500). As described above, the solution indication may be sent via RRC signaling (i.e., which solution to use may be configured via RRC signaling). For example, if measurements are configured before configuring CA, then the eNB 14 may configure the UE 16 to use the solution described above with respect to FIGS. 6 and 7. On the other hand, if the network is interested in IDC problems even if measurements are not configured, then the eNB 14 may configure the UE 16 to use the solution described above with respect to FIG. 5. The UE 16 then uses the indicated solution to perform IDC signaling (step 502).

Figure 10:
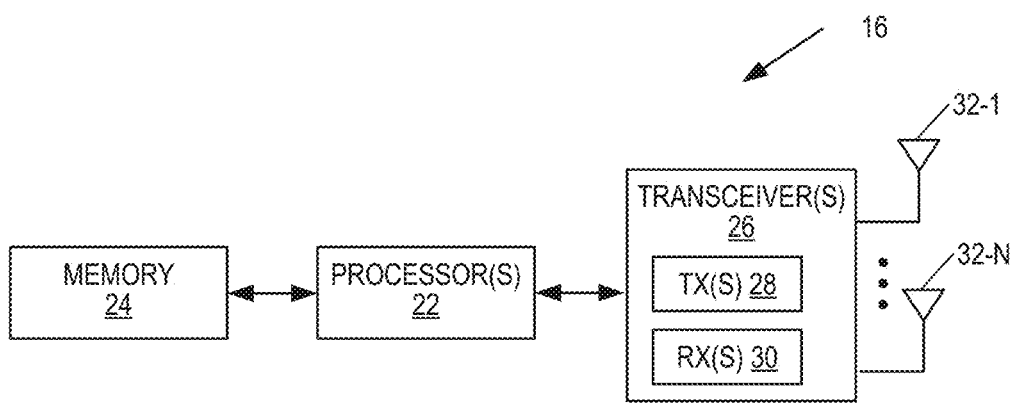
FIGS. 10 and 11 are block diagrams that illustrate a wireless device according to some embodiments of the present disclosure.

FIG. 10 is a block diagram of a wireless device 16 according to some embodiments of the present disclosure. As illustrated, the wireless device 16 includes circuitry that operates to cause the wireless device 16 to implement the methods and functionality described herein. In one example, the circuitry can be in the form of processing means, which may include one or more processors 22 (e.g., one or more Central Processing Units (CPUs), one or more Application Specific Integrated Circuits (ASICs), and/or one or more Field Programmable Gate Arrays (FPGAs)) and memory 24 containing instructions executable by the one or more processors 22 whereby the wireless device 16 operates according to any of the embodiments described herein. The wireless device 16 also includes multiple radio transceivers 26 (e.g., LTE, WiFi, Bluetooth, GNSS, etc.) and at least one antenna 32 for each transceiver 26. Each transceiver 26 includes one or more transmitters 28 and/or one or more receivers 30. The transceiver 26 includes various types of circuitry such as, for example, filters, mixers, amplifiers, etc.

In some embodiments, a computer program is provided including instructions which, when executed by the at least one processor 22, cause the at least one processor 22 to carry out the functionality of the wireless device 16 according to any one of the embodiments described herein is provided. In some embodiments, a carrier containing the aforementioned computer program product. The carrier is one of an electronic signal, an optical signal, a radio signal, or a computer readable storage medium (e.g., a non-transitory computer readable medium such as the memory 24).

Figure 11:
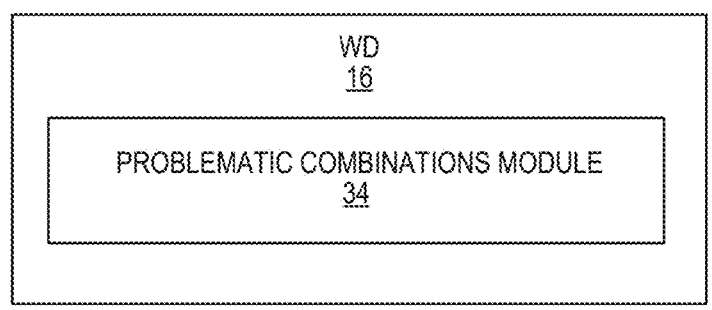

FIG. 11 is a block diagram of a wireless device 16 according to some embodiments of the present disclosure. The wireless device 16 includes a problematic combinations module 34, which is implemented in software that is stored in a computer readable medium (e.g., memory) and executed by a processor of the wireless device 16. The problematic combinations module 34 is operative to send at least one indicator of at least one problematic uplink carrier aggregation frequency band combination to a network node.

Figure 12:
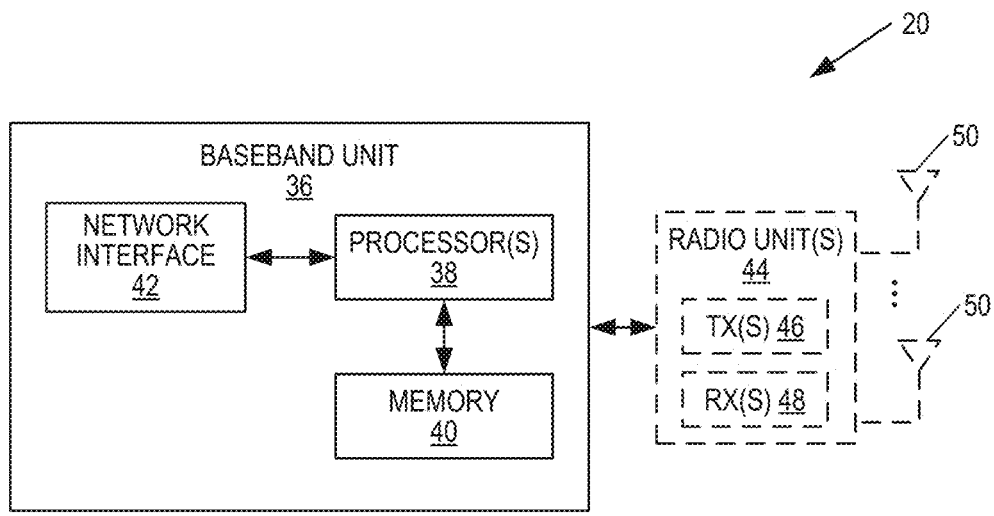
FIGS. 12 and 13 are block diagrams that illustrate a network node according to some embodiments of the present disclosure.

FIG. 12 is a block diagram of a network node 20 according to some embodiments of the present disclosure. The network node 20 may be any type of network node (e.g., a base station (e.g., an eNB), a Mobility Management Entity (MME), a Serving Gateway (S-GW), a Packet Data Network (PDN) Gateway (P-GW), etc.). As illustrated, the network node 20 includes circuitry that operates to cause the network node 20 to implement the methods and functionality described herein. In one example, the network node 20 includes a baseband unit 36 that includes circuitry in the form of processing means which may include one or more processors 38 (e.g., one or more CPUs, one or more ASICs, and/or one or more FPGAs) and memory 40 containing instructions executable by the one or more processors 38 whereby the network node 20 operates according to any of the embodiments described herein. As illustrated, the network node 20 also includes a network interface 42, which allows the network node 20 to communicate with one or more additional network nodes in a wireless communications network. The network interface 42 may include one or more components (e.g., network interface card(s)) that connect the network node 20 to other systems.

If the network node 20 is a radio network node (e.g., a base station 14), the network node 20 also includes one or more radio units 44, including one or more transmitters 46 and one or more receivers 48 coupled to one or more antennas 50. In some embodiments, the functionality of the network node 20 is implemented in software stored in the memory 40 for execution by the one or more processors 48. In some embodiments, the network node 20 may include additional components responsible for providing additional functionality, including any of the functionality identified above and/or any functionality necessary to support the solutions described above.

Figure 13:
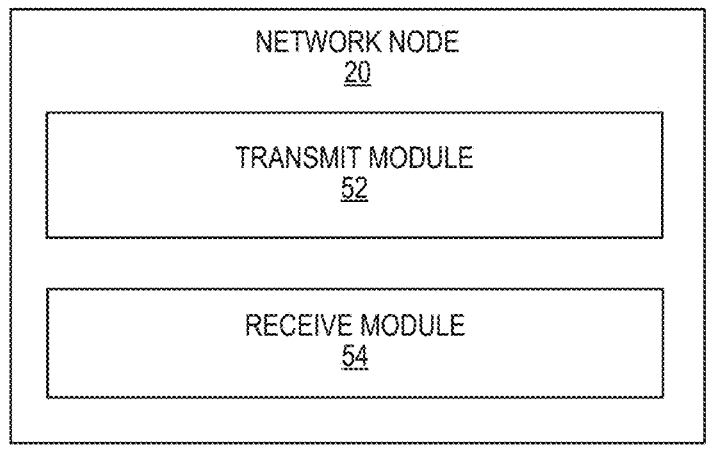

FIG. 13 is a block diagram of a network node 20 according to some embodiments of the present disclosure. The network node 20 includes a transmit module 52 and a receive module 54, each of which is implemented in software that is stored in a computer readable medium (e.g., memory) and executed by a processor of the network node 20. The transmit module 52 is operative to provide a configuration to measure on a plurality of frequency bands. The receive module 54 is operative to receive compatibility information sent to the network node 20, the compatibility information indicating a plurality of uplink carrier aggregation frequency band combinations supported by the user equipment, and receive at least one indicator of at least one problematic uplink carrier aggregation frequency band combination. Notably, the transmit module 52 and the receive module 54 may correspond to features of the same or different network nodes.

Some exemplary, non-limiting examples of embodiments of the present disclosure are provided below.

Embodiments of a method in a User Equipment (UE) in communication with an evolved Node B (eNB) are disclosed. In some embodiments, the method in the UE comprises sending an IDC indication to the eNB including information of problematic UL CA combinations. In this manner, the eNB is provided an indication from which the eNB can deduce which frequencies need to be avoided for UL CA.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of a method in an eNB in communication with a UE are also disclosed. In some embodiments, the method in the eNB comprises receiving an IDC indication from the UE including information of problematic UL CA combinations. In some embodiments, the eNB deduces frequencies to avoid UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of a UE for communication with an eNB are also disclosed. In some embodiments, the UE is adapted to send an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination.

In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

Embodiments of an eNB for communication with a UE are also disclosed. In some embodiments, the eNB is adapted to receive an IDC indication from the UE including information of problematic UL CA combinations.

In some embodiments, the eNB is adapted to deduce frequencies to avoid for uplink carrier aggregation from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, a UE for communication with an eNB comprises at least one transceiver, at least one processor, and memory storing instructions executable by the at least one processor whereby the UE is operable to send, via the at least one transceiver, an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. Further, in some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, an eNB for communication with a UE comprises at least one communication interface, at least one processor, and memory storing instructions executable by the at least one processor whereby the eNB is operable to receive, via the at least one communication interface, an IDC indication from the UE including information of problematic UL CA combinations. In some embodiments, the eNB is adapted to deduce frequencies to avoid UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, a UE for communication with an eNB comprises a problematic combinations module operable to send an IDC indication to the eNB including information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

In some embodiments, an eNB for communication with a UE comprises a receive module operable to receive an IDC indication from the UE including information of problematic UL CA combinations. In some embodiments, the eNB further comprises a deduce module operable to deduce frequencies to avoid for UL CA from the received information of problematic UL CA combinations.

In some embodiments, the UE only indicates a UL CA combination as problematic if the UL CA combination is a combination of uplink carriers supported by the UE, measurement objects are configured for all corresponding downlink carriers, and the UE experiences or expects to experience IDC problems due to the UL CA combination. In some embodiments, the problematic UL CA combination is a UL CA combination for which the UE experiences IDC problems.

In some embodiments, the problematic UL CA combination is identified by a set of measurement object identities for all of the corresponding downlink carriers for the UL CA combination.

In some embodiments, the IDC indication comprises, for each problematic UL CA combination, a set of measurement object identities for all of the corresponding downlink carriers for the problematic UL CA combination.

The problematic combinations module, the receive module and the deduce module recited above, may in some embodiments be implemented as computer programs running on one or more processor similar to what is discussed in connection with FIGS. 11 and 13, Some further embodiments include a user equipment, comprising:
    one or more transceivers;
    at least one processor; and
    memory storing instructions executable by the at least one processor whereby the user equipment is operable to:
    send at least one indicator of at least one problematic uplink carrier aggregation frequency band combination to a network node.

In some embodiments, the user equipment is further operable to:
    send compatibility information to a network node, the compatibility information indicating a plurality of uplink carrier aggregation frequency band combinations supported by the user equipment;
    wherein sending the at least one indicator comprises sending a bit map for the plurality of supported band combinations that indicates, for each combination, whether the combination is problematic.

According to some other embodiments, the user equipment is further operable to:
    send compatibility information to a network node, the compatibility information indicating a plurality of uplink carrier aggregation frequency band combinations supported by the user equipment;
    wherein sending the at least one indicator comprises sending a list of indexes comprising problematic uplink carrier aggregation frequency band combinations.

According to still other embodiments, the user equipment is further operable to:
    receive a configuration from a network node to measure on a plurality of frequency bands;
    wherein the at least one problematic uplink carrier aggregation frequency band combination is at least one combination of the plurality of frequency bands that the user equipment is configured to measure on and that the user equipment has determined is problematic.

The following acronyms are used throughout this disclosure.

2UL Two Uplink Component Carrier
3GPP Third Generation Partnership Project
5G Fifth Generation
ASIC Application Specific Integrated Circuit
CA Carrier Aggregation
CC Component Carrier
CIF Carrier Indicator Field
CPU Central Processing Unit
CSI Channel State Information
DL Downlink
DRX Discontinuous Reception
eNB Evolved Node B
EPDCCH Enhanced or Evolved Physical Downlink Control Channel
E-UTRA Evolved Universal Terrestrial Radio Access
E-UTRAN Evolved Universal Terrestrial Radio Access Network
FDM Frequency Division Multiplexing
FPGA Field Programmable Gate Array
GNSS Global Navigation Satellite System
ID Identity
IDC In-Device Coexistence
IE Information Element
IM Inter-Modulation
ISM Industrial, Scientific, and Medical
LTE Long Term Evolution
M2M Machine-to-Machine
MHz Megahertz
MIMO Multiple Input Multiple Output
MME Mobility Management Entity
MO Measurement Object
MTC Machine Type Communication
PCell Primary Cell
PDCCH Physical Downlink Control Channel
PDN Packet Data Network
PDSCH Physical Downlink Shared Channel
P-GW Packet Data Network Gateway
RAN Radio Access Network
RAN4 Radio Access Network Working Group 4
Rel Release
RRC Radio Resource Control
RRM Radio Resource Management
SCEF Service Capability Exposure Function
SCell Secondary Cell
S-GW Serving Gateway
TDM Time Division Multiplexing
TS Technical Specification
UE User Equipment
UL Uplink
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method in a User Equipment (UE) in communication with an Evolved Node B (eNB), the method comprising:
    determining one or more problematic uplink carrier aggregation combinations for which the UE experiences or expects to experience In-Device Coexisting (IDC) problems; and
    sending an IDC indication to the eNB, including information indicating the one or more problematic uplink carrier aggregation combinations.

2. The method according to claim 1, wherein the UE only indicates an uplink carrier aggregation combination as problematic if the uplink carrier aggregation combination is a combination of uplink carriers supported by the UE, measurement objects are configured for all corresponding downlink carriers, and the UE experiences or expects to experience IDC problems due to the uplink carrier aggregation combination.

3. The method according to claim 2, wherein the problematic uplink carrier aggregation combination is an uplink carrier aggregation combination for which the UE experiences IDC problems.

4. The method according to claim 1, wherein a problematic uplink carrier aggregation combination is identified by a set of measurement object identities for all of the corresponding downlink carriers for the uplink carrier aggregation combination.

5. The method according to claim 1, wherein the IDC indication comprises, for each problematic uplink carrier aggregation combination, a set of measurement object identities for all of the corresponding downlink carriers for the problematic uplink carrier aggregation combination.

6. A method in an Evolved Node B (eNB) in communication with a User Equipment (UE), the method comprising:
    receiving an In-Device Coexistence (IDC) indication from the UE, the IDC indication including information indicating one or more problematic uplink carrier aggregation combinations for which the UE experiences or is expected to experience IDC problems; and
    deducing frequencies to avoid for uplink carrier aggregation at the UE, from the received information indicating the one or more problematic uplink carrier aggregation combinations.

7. The method according to claim 6, wherein the UE only indicates an uplink carrier aggregation combination as problematic if the uplink carrier aggregation combination is a combination of uplink carriers supported by the UE, measurement objects are configured for all corresponding downlink carriers, and the UE experiences or expects to experience IDC problems due to the uplink carrier aggregation combination.

8. The method according to claim 7, wherein the problematic uplink carrier aggregation combination is an uplink carrier aggregation combination for which the UE experiences IDC problems.

9. The method according to claim 6, wherein a problematic uplink carrier aggregation combination is identified by a set of measurement object identities for all of the corresponding downlink carriers for the uplink carrier aggregation combination.

10. The method according to claim 6, wherein the IDC indication comprises, for each problematic uplink carrier aggregation combination, a set of measurement object identities for all of the corresponding downlink carriers for the problematic uplink carrier aggregation combination.

11. A User Equipment (UE) for communication with an Evolved Node B (eNB), the UE comprising:
    at least one transceiver;
    at least one processor; and
    memory storing instructions executable by the at least one processor, whereby the UE is operable to:
        determine one or more problematic uplink carrier aggregation combinations for which the UE experiences or expects to experience In-Device Coexistence (IDC) problems; and send, via the at least one transceiver, an IDC indication to the eNB, including information indicating the one or more problematic uplink carrier aggregation combinations.

12. The UE according to claim 11, wherein the UE only indicates an uplink carrier aggregation combination as problematic if the uplink carrier aggregation combination is a combination of uplink carriers supported by the UE, measurement objects are configured for all corresponding downlink carriers, and the UE experiences or expects to experience IDC problems due to the uplink carrier aggregation combination.

13. The UE according to claim 12, wherein the problematic uplink carrier aggregation combination is an uplink carrier aggregation combination for which the UE experiences IDC problems.

14. The UE according to claim 11, wherein a problematic uplink carrier aggregation combination is identified by a set of measurement object identities for all of the corresponding downlink carriers for the uplink carrier aggregation combination.

15. The UE according to claim 11, wherein the IDC indication comprises, for each problematic uplink carrier aggregation combination, a set of measurement object identities for all of the corresponding downlink carriers for the problematic uplink carrier aggregation combination.

16. An Evolved Node B (eNB) for communication with a User Equipment (UE), the eNB comprising:

at least one communication interface;

at least one processor; and memory storing instructions executable by the at least one processor, whereby the eNB is operable to:

receive, via the at least one communication interface, an In-Device Coexistence (IDC) indication from the UE, including information indicating one or more problematic uplink carrier aggregation combinations for which the UE experiences or expects to experience IDC problems; and deduce frequencies to avoid for uplink carrier aggregation at the UE, from the received information indicating the one or more problematic uplink carrier aggregation combinations.

17. The eNB according to claim 16, wherein an uplink carrier aggregation combination is indicated as being problematic only if the uplink carrier aggregation combination is a combination of uplink carriers supported by the UE, measurement objects are configured for all corresponding downlink carriers, and the UE experiences or expects to experience IDC problems due to the uplink carrier aggregation combination.

18. The eNB according to claim 17, wherein the problematic uplink carrier aggregation combination is an uplink carrier aggregation combination for which the UE experiences IDC problems.

19. The eNB according to claim 16, wherein a problematic uplink carrier aggregation combination is identified by a set of measurement object identities for all of the corresponding downlink carriers for the uplink carrier aggregation combination.

20. The eNB according to claim 16, wherein the IDC indication comprises, for each problematic uplink carrier aggregation combination, a set of measurement object identities for all of the corresponding downlink carriers for the problematic uplink carrier aggregation combination.

21. The method of claim 6, further comprising the eNB controlling uplink carrier aggregation at the UE, to avoid any combination of frequencies identified by the UE as being one of the one or more problematic uplink carrier aggregation combinations.

22. The eNB of claim 16, wherein the memory stores further instructions executable by the at least one processor, whereby the eNB is operative to control uplink carrier aggregation at the UE, to avoid any combination of frequencies identified by the UE as being one of the one or more problematic uplink carrier aggregation combinations.

* * * * *